No. 837,538. PATENTED DEC. 4, 1906.
J. H. BIERY & J. H. ZWANGER.
HOSE COUPLING.
APPLICATION FILED AUG. 22, 1905.

WITNESSES:
Johua Bergstrom
E. E. Ellis

INVENTORS
John Henry Biery
Julius Henry Zwanger
BY
Munn & Co.
ATTORNEYS.

UNITED STATES PATENT OFFICE.

JOHN HENRY BIERY AND JULIUS HENRY ZWANGER, OF ALLIANCE, NEBRASKA.

HOSE-COUPLING.

No. 837,538. Specification of Letters Patent. Patented Dec. 4, 1906.

Application filed August 22, 1905. Serial No. 275,313.

*To all whom it may concern:*

Be it known that we, JOHN HENRY BIERY and JULIUS HENRY ZWANGER, citizens of the United States, and residents of Alliance, in the county of Boxbutte and State of Nebraska, have invented a new and Improved Hose-Coupling, of which the following is a full, clear, and exact description.

This invention relates to coupling devices;
and it consists, substantially, in the construction, organization, and combinations of parts hereinafter particularly described, and pointed out in the claim.

Our improvements are intended more especially for use in firmly connecting together adjacent end portions of hose-sections—such, for instance, as are employed between locomotive-engines and their tenders—although said improvements are equally adapted for analogous purposes in the arts.

One of the principal objects of our invention is to provide a coupling device for the purpose named which is strong and durable, simple in the construction and organization of the parts thereof, not liable to get out of order nor easily broken, and also being capable of withstanding considerable strain and readily and easily manipulated in use.

A further object of the invention is to provide a device of the character referred to which is steam and water tight as well as effective and reliable in use, besides being comparatively inexpensive to manufacture and possessing the capacity for long and repeated service.

The above and additional objects are attained by means substantially such as are illustrated in the accompanying drawings, forming a part of this specification, in which similar characters of reference indicate corresponding parts in all the figures.

Figure 1:
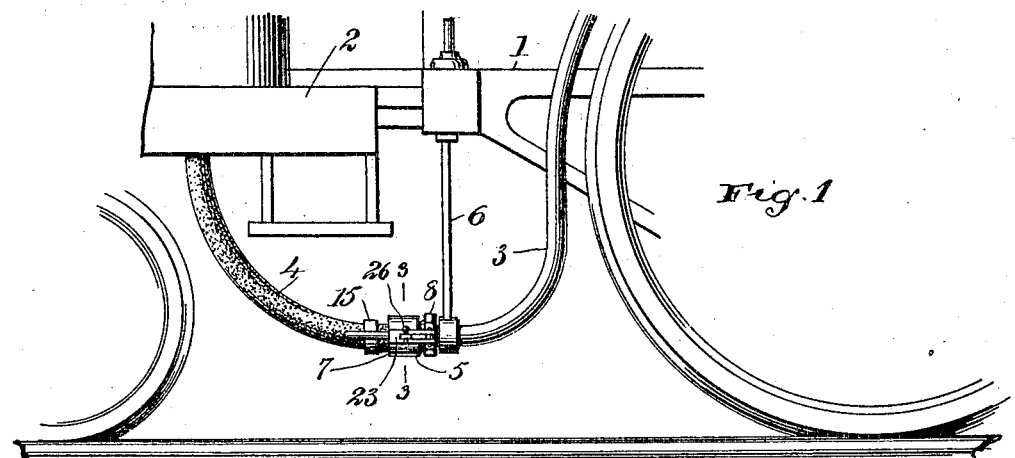
Figure 2:
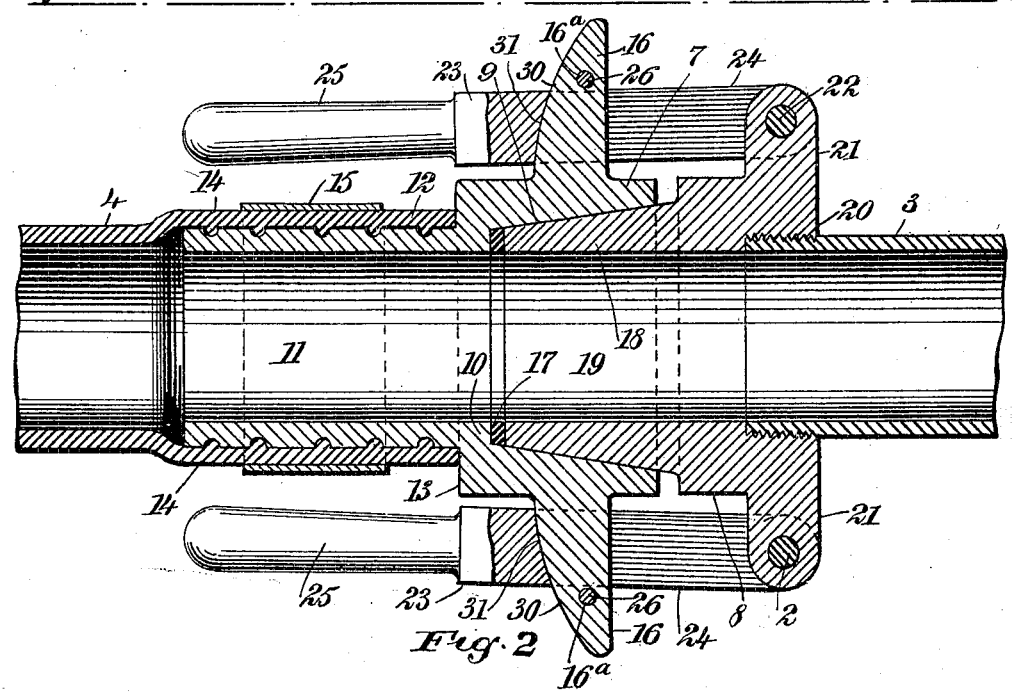
Figure 3:
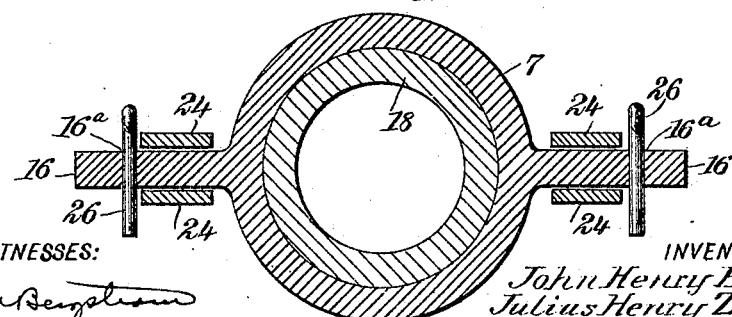

Figure 1 is a side view of adjacent parts of a locomotive-engine and tender, showing our improvemnts as embodied in connection with the sections of flexible hose or pipe employed between such vehicles in a manner well known. Fig. 2 is an enlarged longitudinal sectional view, in part elevation, of an improved coupling device, showing the two heads or members thereof as locked together by the specially-constructed devices employed for that purpose; and Fig. 3 is an enlarged transverse sectional view on the line 3 3 of Fig. 1.

Before proceeding with a more detailed description it may be stated that in the form of our improvements herein shown we preferably employ a coupling device comprising two heads or members, each constructed with a body portion for attachment thereto of an end of one of the hose or other pipe sections to be connected, one of said heads or members being formed with a circular recess having the sides thereof beveled or tapered inwardly and the other head or member having a correspondingly-tapered hollow projection adapted to snugly fit said recess. The said heads or members are provided with specially constructed and organized devices or means for securely locking them in coupled relation, and while we have herein represented our improvements in a certain preferred embodiment it will be understood, of course, that we are not limited to the precise details thereof in practice, since immaterial changes therein may be resorted to coming within the scope of our invention.

Specific reference being had to the accompanying drawings by the designating characters marked thereon, 1 represents the rearward portion of an ordinary locomotive-engine, and 2 the forward portion of its tender, the two being joined together in any usual or well-known way, and 3 and 4 represent sections of hose or other pipe leading from one to the other, the ends of these sections being united by our improved coupling device, (designated in entirety at 5 in Fig. 1,) the said section 3 being preferably supported by a hanger 6, as shown. The said coupling device comprises heads or members 7 and 8, each of suitable size or dimensions, said head or member 7 being formed at one end with a recess having the inner sides thereof beveled or tapered inwardly at 9, the base of which recess is constituted of an inner annular shoulder 10, forming the inner edge of a longitudinal opening or passage 11, constructed interiorly of a neck 12, projecting outwardly from said head or member, said neck externally being of somewhat reduced diameter to form an outer annular shoulder 13, against which may abut the end of the portion of hose or pipe section 4, fitted to the neck, as shown, the outer surface of the latter being formed with circumferential grooves 14, if desired, in which inner portions of the material of such sections may become embedded to more securely fasten the latter to said neck, a band 15 being also applied as an additional security. The head or member 7 is formed externally thereof, preferably at diametrically opposite places, with projecting ears or wings 16, each having an opening 16ª therethrough, and preferably we employ a gasket 17, seated on the inner surface of said shoulder 10 within the said recess of this said head or member 7. The head or member 8 is specially adapted to said section 7, being formed with a projection 18, having therethrough a longitudinal opening or passage 19, substantially of equal diameter with the opening or passage 11 in the head or member 7 and also communicating therewith, this said opening or passage 19 extending all the way through said head or member 8, as shown, and having the sides thereof threaded at 20 for a suitable distance from the outer end by which to receive a corresponding externally-threaded portion of the end of the hose or pipe section 3, as shown. The said head or member 8 is also provided at or near its outer end with lugs 21 in practical alinement with the said ears or wings 16, these lugs constituting bearings for pins 22, on which are loosely supported corresponding ends of locking-levers 23, which are each constructed of duplicate parallel portions 24 and a handle 25. Said duplicate parallel portions of each of said levers are properly spaced apart, (see Fig. 3,) so as to enable the corresponding one of the ears or wings 16 to projected between them when the levers are carried to the position indicated in Figs. 1 and 2, the openings 16ª in said ears being thus brought to the outer edges of the levers, and cotter or split pins 26 are passed through said openings to lock the levers in place as well as to secure the heads or members together in a steam and water tight manner, as is apparent. It is to be noted, of course, that the outer surface of the hollow projection 18 is beveled or tapered in correspondence with the sides of the recess in said head or member 7 and also that the inner end of said projection bears upon or against the hereinbefore-mentioned gasket 17. When the coupling heads or members are thus united, there is no leakage at any part of the joint between them and there is no liability of uncoupling thereof; but to disconnect or separate them it is simply necessary to remove the pins 26 and carry or turn the levers outwardly, as will be readily understood without further explanation. It will be further noted that the said ears or wings 16 are formed at 30 with convexed or outwardly-curved cam edges, coöperating with which are the inner corresponding surface portions 31 of the levers intermediate the said parallel portions of each of the latter, and thus may the conical projection of the said head or member 8 be forced tightly into the correspondingly-shaped recess in the said head or member 7 in an obvious manner.

Having thus described our invention, we claim as new and desire to secure by Letters Patent—

A hose-coupling comprising a head formed with a recess having inwardly-tapered sides, and another head having a hollow tapered projection adapted to fit said recess, one of said heads having lateral ears formed with cam edges, and the other having pivoted levers comprising lateral members for embracing the ears, and a cam-surface for coöperating with the cam-surface of the ears, whereby to force the tapered portions of the head into contact with each other.

In testimony whereof we have signed our names to this specification in the presence of two subscribing witnesses.

JOHN HENRY BIERY.
JULIUS HENRY ZWANGER.

Witnesses to signature of J. H. Biery:
  JOHN D. MOSS,
  ARTHUR H. KING.

Witnesses to signature of Julius Henry Zwanger:
  H. B. HAMILTON,
  MANFORD E. WILLIAMS.